(No Model.) 2 Sheets—Sheet 1.
R. C. WRIGHT & F. J. CRANE.
BICYCLE SADDLE.
No. 537,376. Patented Apr. 9, 1895.
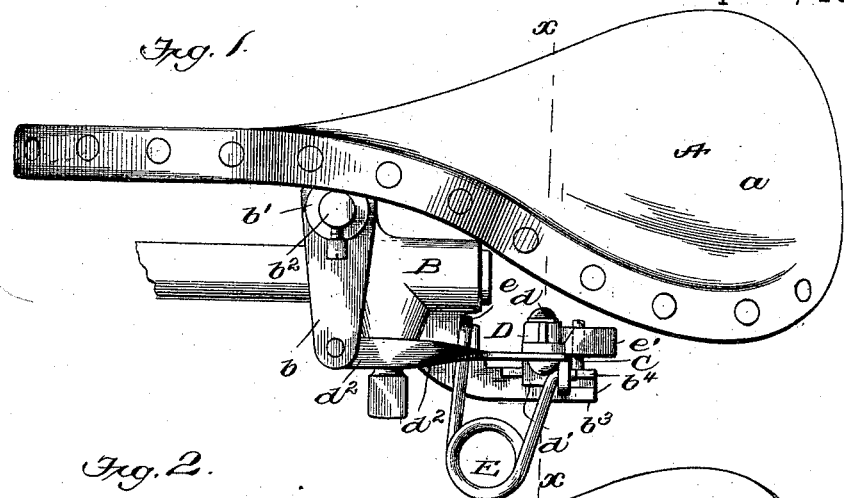
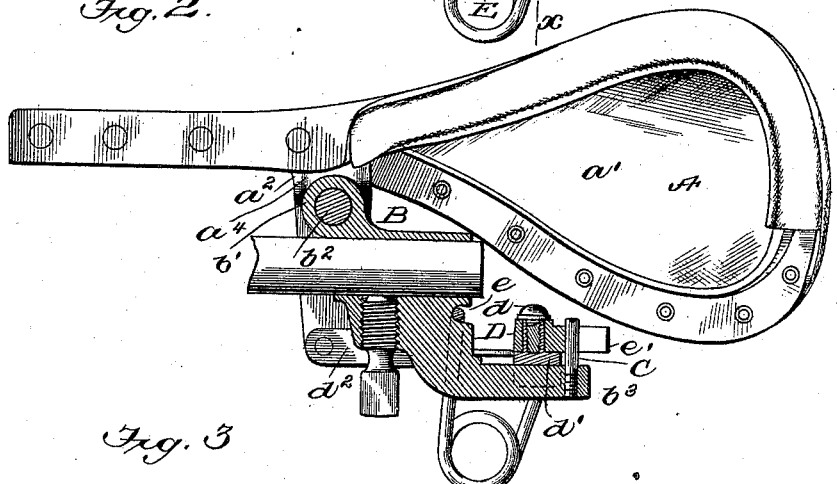
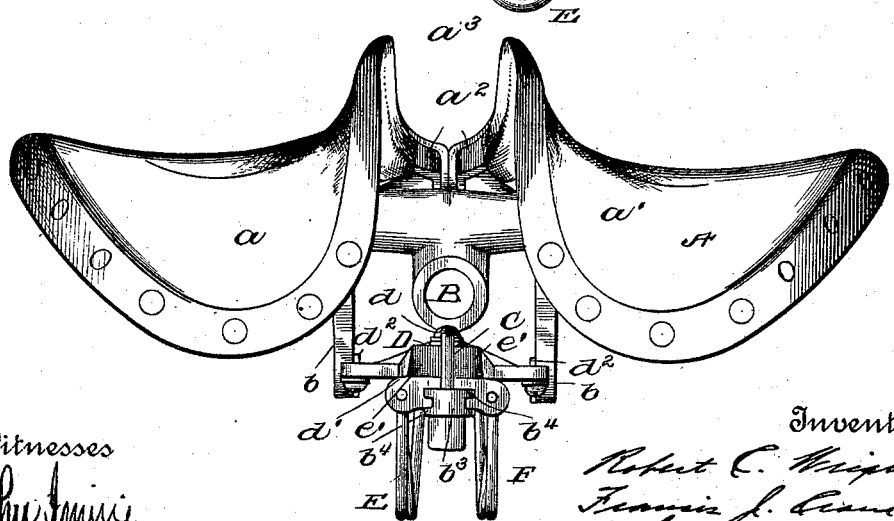
Witnesses
Inventors
Robert C. Wright
Francis J. Crane
Attorney (No Model.) 2 Sheets—Sheet 2.
R. C. WRIGHT & F. J. CRANE.
BICYCLE SADDLE.
No. 537,376. Patented Apr. 9, 1895.
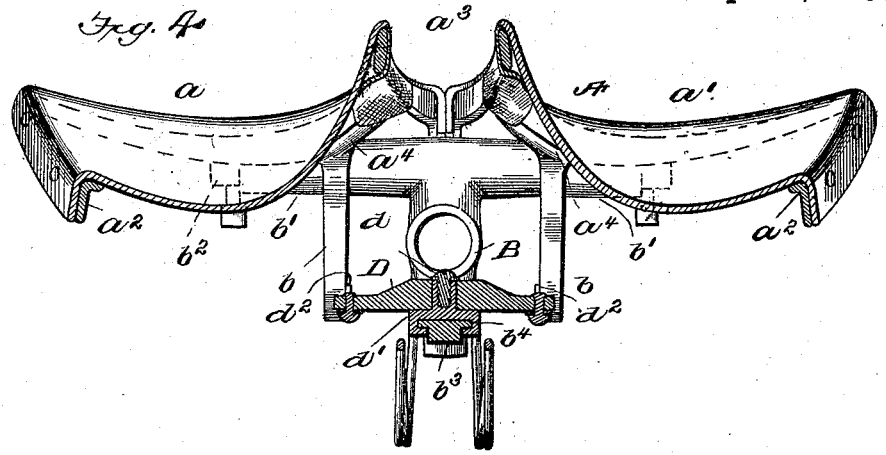
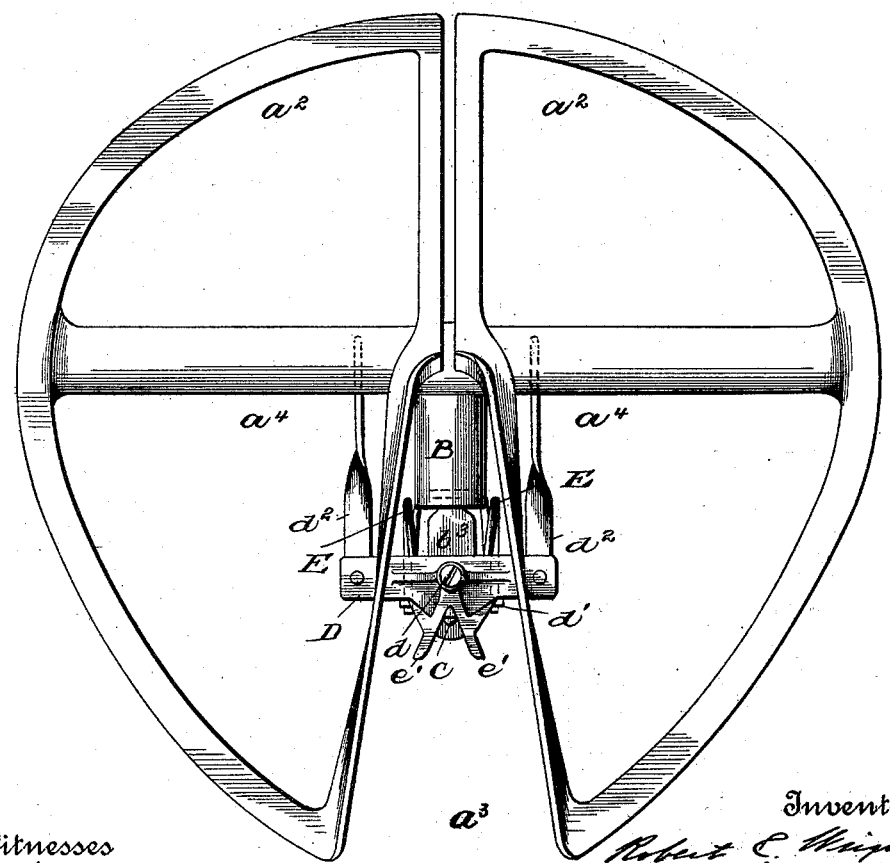

UNITED STATES PATENT OFFICE.

ROBERT C. WRIGHT AND FRANCIS J. CRANE, OF DENVER, COLORADO.

BICYCLE-SADDLE.

SPECIFICATION forming part of Letters Patent No. 537,376, dated April 9, 1895.

Application filed September 30, 1893. Serial No. 486,906. (No model.)

*To all whom it may concern:*

Be it known that we, ROBERT C. WRIGHT and FRANCIS J. CRANE, of Denver, in the county of Arapahoe and State of Colorado, have invented certain new and useful Improvements in Bicycle-Saddles; and we do hereby declare the following to be a full, clear, and exact description of the invention, such as will enable others skilled in the art to which it appertains to make and use the same.

This invention relates to certain new and useful improvements in bicycle-saddles, and it has for its object the production of a new and improved saddle which will readily adjust itself to the movement of the rider's body and which will be locked in its normal position when not in use.

The invention consists, primarily, of a bicycle saddle composed of two parts or sections so connected together that they are caused to have an alternate reciprocal movement when in use, and means for automatically returning said parts or sections to, and holding them in, their normal horizontal position, after the saddle has been in use.

The invention consists of a bicycle saddle formed in two pivoted parts or sections normally held locked together or in fixed relation to each other when not in use.

The invention further consists of a bicycle saddle formed in two pivoted parts or sections normally held locked together or in fixed relation to each other, and connections between said parts or sections whereby they are free to have an alternate reciprocal motion when the saddle is in use.

The invention further consists of a saddle formed in two parts or sections, pivotal connections between said parts or sections whereby they are free to have an alternate reciprocal motion, and a lock controlled by said parts or sections which holds the latter in their normal position when not in use.

The invention also comprises the details of construction, combination and arrangement of parts, substantially as hereinafter fully set forth and particularly pointed out in the claims.

In the accompanying drawings:—Figure 1 is a view in side elevation. Fig. 2 is a vertical, longitudinal sectional view. Fig. 3 is an end view. Fig. 4 is a transverse sectional view on line $x$—$x$, Fig. 1. Fig. 5 is a plan view with the saddle covering or seat broken away.

Referring to the drawings, A designates the saddle, proper, which is composed of two corresponding parts or sections $a$, $a'$, the curvature or contour of which conforms to the anatomy of the rider's body. The frame $a^2$ of each part or section is covered with leather or its equivalent, and said frames are so bent that a narrow space or opening $a^3$ is left between their inner edges of the forward half of the seat so as to relieve pressure from the prostatic gland and urethra of the rider, the same as in our pending application for Letters Patent, filed April 28, 1893, Serial No. 472,276.

From a cross-bar $a^4$ of each section frame depends an arm $b$ having an upper socket $b'$ in which latter fit the reduced ends of a rod $b^2$ made fast or secured to a socket B, in which latter the supporting post (not shown) is designed to fit. From this socket extends a right angular stationary arm $b^3$ which is provided with lateral ribs or flanges $b^4$ and from the upper surface of this arm at its end projects a short post or stud C of approximate V-shape in cross-section.

D is a lever fulcrumed at its center on a pin or stud $d$ extending from or secured to a plate $d'$ movable on arm $b^3$ and provided with grooved ends in which fit the ribs or flanges $b^4$. At its ends this lever is connected by links $d^2$ to the lower ends of depending arms $b$ and by this means a pivoted reciprocal motion between the parts or sections of the saddle is established. To the end of movable plate $d'$ are connected the ends of a double coil-spring E, the central portion of which fits in a groove or cut away portion $e$ of socket B. This spring serves to normally hold the sliding plate $d'$ toward or at the outer end of arm $b^3$.

From the center of lever D project two divergent arms $e'$, which together form a V-shape jaw up through which the post or stud C is designed to project. When the saddle is not occupied, the spring holds the V-shape jaw tight up against post C, which fits snug in the vertex thereof, the said stud being beveled on its sides to correspond with the inner end of the jaw. While in this position the lever cannot turn on its pivot and in consequence the sections of the saddle are held locked in their normal corresponding positions. As soon as the saddle is occupied the weight of the rider will cause the depending arms to pull rearward on the connecting links, thus moving the lever and its locking jaw away from stud C as against the action of the spring. When thus released the lever is free to turn on its fulcrum and an easy reciprocal motion between the sections of the saddle can be had. As one section is moved downward at its forward end by reason of greater pressure at that point in working the bicycle or the like, the corresponding end of the other section is raised or elevated, the pivotal reciprocal connection between the sections permitting of this corresponding change of positions. When the saddle is vacated and weight removed therefrom the sections will at once assume their normal positions and be held locked by the engagement of the V-shape jaw of the lever with the stud C.

The advantages of our invention are apparent to those skilled in the art to which it appertains.

It will be seen that we have produced a bicycle saddle formed in two separate parts or sections reciprocally connected together whereby when in use they have alternate movements, and a lock for automatically holding said parts or sections in proper position ready for occupancy and permitting the rider to mount without fear of injury.

In this case we do not broadly claim a bicycle saddle divided longitudinally into two parts or sections and means connecting said parts or sections so that they are caused to move in alternate reciprocal relation, since the same forms the subject matter of our application for patent, filed April 28, 1893, Serial No. 472,276.

We claim as our invention—

1. A bicycle saddle composed of two parts or sections connections between said parts or sections whereby the latter are caused to have an alternate reciprocal movement, and means for automatically returning said parts or sections to, and holding them in, their normal horizontal position, after the saddle has been in use, as set forth.

2. A bicycle-saddle, composed of two parts or sections, connections between said parts or sections whereby the latter are caused to have an alternate reciprocal movement, and a lock for automatically holding said parts or sections in their normal horizontal position when the saddle is not in use, substantially as set forth.

3. A bicycle saddle composed of two parts or sections pivotally mounted, and a lock for holding said parts or sections in fixed relation when the saddle is not in use and which is automatically released when said saddle is occupied, as set forth.

4. A bicycle saddle composed of two parts or sections pivotally mounted, pivotal connections between said parts or sections whereby the latter are caused to have an alternate reciprocal movement and means for holding said connections stationary when the saddle is not in use, as set forth.

5. A bicycle saddle composed of two parts or sections pivotally mounted, a rocking lever pivotally connected at its ends to said parts or sections and means for automatically returning said parts or sections to, and holding them in, their normal horizontal position after the saddle has been in use, substantially as set forth.

6. A bicycle saddle composed of two parts or sections pivotally mounted, a lever connected at its ends to said parts or sections and a lock for holding said lever stationary when the saddle is not in use, substantially as set forth.

7. A bicycle saddle composed of two parts or sections pivotally mounted, a lever connected at its ends to said parts or sections, a locking jaw carried by said lever, a stationary post or stud and means for causing said locking-jaw to engage said post or stud when the saddle is not in use, substantially as set forth.

8. A bicycle saddle composed of two parts or sections pivotally mounted, a lever normally held locked, a spring-pressed movable support for said lever, and connections between said lever and said parts or sections, whereby when the saddle is occupied said lever is unlocked and said parts or sections are free to have an alternate reciprocal movement, substantially as set forth.

9. A bicycle saddle composed of two parts or sections pivotally mounted, a stationary arm having a stud or post projecting therefrom, a lever connected at its ends to said parts or sections, and a spring-held movable support for said lever mounted on said stationary arm, said lever being normally held in engagement with said stud or post, substantially as set forth.

10. A bicycle saddle composed of two parts or sections pivotally mounted, a stationary arm having a stud or post, a lever having a V-shape locking jaw, a support for said lever movable on said stationary arm, and a spring or springs bearing against said movable support and normally holding said locking jaw in engagement with said stud, substantially as set forth.

11. A bicycle saddle composed of two parts or sections pivotally mounted, a stationary arm having a stud or post and lateral ribs or flanges, a plate having grooved ends fitted on said stationary arm, a spring or springs bearing against said plate, a lever fulcrumed on and movable with said plate, divergent arms extending from said lever and designed to engage said stud or post, and connections between said lever and said parts or sections, substantially as set forth.

12. The herein-described improved bicycle saddle, comprising the socket, the stationary arm projecting therefrom having a stud or post, a rod supported by said socket, the seat frames pivotally mounted on said rod and having depending arms, the lever fulcrumed at its center and having a V-shape locking jaw, links connecting the ends of said lever to said depending arms, the support for said lever movable on said stationary arm, the double spring bearing against said socket and connected at its ends to the ends of said movable support, whereby said locking jaw is normally held in engagement with said stud or post, substantially as set forth.

In testimony whereof we have signed this specification in the presence of two subscribing witnesses.

ROBERT C. WRIGHT.
FRANCIS J. CRANE.

Witnesses:
C. H. BRIERLEY,
ROBT. DE MAN.